US008190911B2

(12) United States Patent
Chopart

(10) Patent No.: US 8,190,911 B2
(45) Date of Patent: May 29, 2012

(54) ENTITY-IDENTITY BASED SECURITY PROCUREMENT OF COMPUTER FILES THAT ARE DOWNLOADABLE TO AN AIRCRAFT, METHOD OF AUTHENTICATION, AND ASSOCIATED SYSTEM AND AIRCRAFT

(75) Inventor: Stephane Chopart, Saint-Jory (FR)

(73) Assignee: Airbus Operations SAS, Toulouse (FR)

( * ) Notice: Subject to any disclaimer, the term of this patent is extended or adjusted under 35 U.S.C. 154(b) by 715 days.

(21) Appl. No.: 12/245,989

(22) Filed: Oct. 6, 2008

(65) Prior Publication Data

US 2009/0106560 A1     Apr. 23, 2009

(30) Foreign Application Priority Data

Oct. 17, 2007   (FR) ...................................... 07 58392

(51) Int. Cl.
 *H04L 29/06*     (2006.01)
(52) U.S. Cl. ....................................................... 713/189
(58) Field of Classification Search ................... 713/189
 See application file for complete search history.

(56) References Cited

U.S. PATENT DOCUMENTS

| 6,886,096 | B2 * | 4/2005 | Appenzeller et al. | 713/170 |
|---|---|---|---|---|
| 6,957,330 | B1 * | 10/2005 | Hughes | 713/163 |
| 2003/0027550 | A1 * | 2/2003 | Rockwell | 455/410 |
| 2003/0027551 | A1 * | 2/2003 | Rockwell | 455/410 |
| 2005/0198517 | A1 | 9/2005 | Ivanov et al. | |
| 2005/0228549 | A1 * | 10/2005 | Stickling | 701/3 |
| 2009/0024312 | A1 * | 1/2009 | Brinkman | 701/200 |
| 2009/0138874 | A1 * | 5/2009 | Beck et al. | 717/173 |

FOREIGN PATENT DOCUMENTS

| EP | 0 686 906 A2 | 12/1995 |
|---|---|---|
| EP | 1 380 917 A2 | 1/2004 |

OTHER PUBLICATIONS

Richard Robinson et al., "Electronic Distribution of Airplane Software and the Impact of Information Security on Airplane Safety", Computer Safety, Reliability, and Security Lecture Notes in Computer Science, vol. 4680, pp. 28-39.
Lihua Wang et al., "ID-Based Series-Parallel Multisignature Schemes for Multi-Messages from Bilinear Maps", Coding and Cryptography Lecture Notes in Computer Science, vol. 3969, Jan. 1, 2006, pp. 291-303.
Nikolaos Oikonomidis et al., "Identity Based Protocols for Secure Electronic Content Distribution and Licensing", Proceedings of the Fourth International Conference on Web Delivering of Music, Sep. 13, 2004, pp. 92-100.

* cited by examiner

*Primary Examiner* — Michael S McNally
(74) *Attorney, Agent, or Firm* — Oblon, Spivak, McClelland, Maier & Neustadt, L.L.P.

(57) ABSTRACT

A method and system for processing or authenticating an operating computer file of an equipment item installed on board an aircraft. The method includes generating a first private key according to a scheme based on an identity of a first entity, the first private key being unique to the first entity. The method also includes signing the computer file using the first private key and transmitting the signed computer file to the aircraft through a network without a digital certificate that certifies the identity of the first entity. The method further includes verifying the signature of the signed computer file from a first public key determined according to a scheme based on the identity of the first entity, without using the digital certificate that certifies the identity of the first entity.

14 Claims, 6 Drawing Sheets

ENTITY-IDENTITY BASED SECURITY PROCUREMENT OF COMPUTER FILES THAT ARE DOWNLOADABLE TO AN AIRCRAFT, METHOD OF AUTHENTICATION, AND ASSOCIATED SYSTEM AND AIRCRAFT

The present invention relates in general to the security of computer files installed on board an aircraft and in particular to the mechanisms with which the authenticity thereof, or in other words the origin and integrity, can be guaranteed.

Guaranteeing the origin of a file is understood as guaranteeing that the file indeed is issued by the supplier of the file, for example by an aeronautical manufacturer, by an airline company or by an equipment manufacturer.

Guaranteeing the integrity of a file is understood as guaranteeing that the contents thereof have not been altered accidentally or intentionally.

Operations of configuring, maintaining or tuning up an aircraft commonly necessitate loading or downloading program or data files into computers or avionic systems installed on board.

Downloading of computer files to an aircraft conventionally takes place in accordance with the ARINC 665 industrial standard. Among other features, this standard defines the header format of files that can be downloaded to the aircraft, the header containing configuration, compatibility and integrity information items.

The integrity of downloaded programs or data with regard, for example, to transmission or recording errors is assured in practice by an error detection code (CRC—"Cyclic Redundancy Check" in English terminology) present in the header of these files.

However, this CRC code was not designed to anticipate malicious acts by which a third party intentionally modifies the computer code of the data or programs and recalculates the associated CRC code.

A known method for making these files secure against such malicious acts is to digitally sign the files to be downloaded to an aircraft and to check this digital signature during downloading and execution.

A known digital signature mechanism is based on an asymmetric cryptography algorithm and a public key infrastructure such as defined by the RFC 3647 standard—Internet X.509 Public Key Infrastructure (PKI).

According to this scheme, a supplier signs a digital imprint of the file by means of its private key and attaches to the signed file the corresponding public key accompanied by an electronic certificate established by a certification authority attesting that the public key actually belongs to the supplier.

The supplier's electronic certificate is signed by the private key of the certification authority. This private key is associated with what is known as a "root" certificate, self-signed by the certification authority. The "root" certificate is the heart of the certification mechanism and therefore of any confidence placed in the system. This certificate is considered to be authentic. The confidence placed in this root certificate is proportional to the confidence placed in the certification authority, through its key management infrastructure and the established certification policy.

On board the aircraft, the user of a downloaded file signed in this way is able to verify, with the aid of the supplier's public key and the digital signature, that the file in question is indeed that originally signed by the supplier.

In practice, the user also verifies on the one hand that the supplier's certificate is authentic and on the other hand that the certificate is not revoked or expired at the time of the signature.

In current systems, whether or not the certificate is revoked or expired is verified with the aid of certificate revocation lists kept up to date by the certification authority. Regular updating of these revocation lists requires that regular loading thereof on board the aircraft be undertaken. This process therefore necessitates extra work, and the omission of a single update may make it impossible to use downloaded valid files. This solution therefore appears to be poorly adapted to commercial airplanes.

The authenticity of the supplier's certificate is in turn verified with the aid of the public key of the certification authority, the link between the public key and the identity of the authority being guaranteed by the "root" certificate.

Thus verification of the authenticity of a file on board an aircraft requires that a root certificate be available on board the aircraft.

The security of the system for signature of files that can be downloaded on board the aircraft is therefore strongly tied to the way in which the root certificate is protected on board the aircraft.

If the root certificate is stored in a "safe" electronic component such as a hardware component of ROM type ("Read Only Memory" in English terminology), the security of the system is strong but access to the root certificate requires a complex operation upon each requested modification.

On the other hand, if the certificate is made easily accessible, the flexibility of use is then high but the security of the system is more easily compromised.

A need therefore exists for a mechanism that ensures the security of computer files in a manner adapted to downloading files on board an aircraft and that is both safe and flexible in use.

To this end, the invention is aimed in particular at a method for processing an operating computer file of an equipment item installed on board an aircraft, especially for ensuring the security thereof, the method comprising the digital signature of the said computer file by means of a least one first private key, the said first private key being generated according to a scheme based on the identity (IBE, an acronym for "Identity Based Encryption" according to English terminology) of a first entity.

The entity can be understood as a physical entity, such as an individual, an object or a group of sub-entities, or as a legal entity, such as a company. As an example, the entity may be an editor of a software program or data producer, a supplier or retailer of these program or data files, an airline company, an aeronautical manufacturer or a manufacturer of aeronautical equipment installed on board.

By "operating file" there is understood any program or data computer file that is useful for or during the operation of the equipment to which it relates. For example, there are known command files, execution files, data files and parameterization files.

The identity-based encryption principle relies on the unicity of the identity of the entity. The invention makes it possible to use a public key that is derived from the identity of the entity and that differs for two entities having a different identity.

Because of the unicity of public keys and of their attachment to the identity in question, there is no need for a certificate. The mechanisms for ensuring the security of files downloadable on board an aircraft are then simplified.

The identity of the entity is a public information item available to all to identify the entity among all the existing entities, especially in the form of intelligible character strings. It may involve commonly used identification information items: name of an individual or object, social security number, registration number of a company in the commercial register. The identity may also be seen as a qualifier of a group of sub-entities (or sub-group), such as the pilots or the flight attendants ("steward" according to English terminology).

In contrast to the known solutions, the method according to the invention for ensuring security is more adapted to the useful life of the airplane. In fact, the PKI infrastructure certificates explained in the foregoing have a life cycle that is intentionally limited for reasons of security, averaging three years for a user certificate and twenty years for a root certificate. These useful lives are poorly adapted to the useful life of a commercial aircraft (forty years). A large number of generations of new certificates can then be anticipated throughout the life of the aircraft. In the absence of user certificates, as implemented by the present invention, there is no longer any need to intervene frequently in already signed files.

The invention also has the advantage of avoiding the use of a certificate management infrastructure and the associated heavy and costly investment.

Authentication management according to the invention is also improved, in that it is possible to avoid updating a revocation list on board the aircraft.

According to one embodiment, the method comprises the digital signature of the computer file signed by at least one second private key generated according to a scheme based on the identity of a second entity.

According to the invention, the file is therefore signed a second time. This scheme increases the security, in that the second signature guarantees prior verification and validation of the first signature before distribution of the multi-signed file on board the aircraft. More complex flows of tasks ("workflow" according to English terminology) benefiting from the multiple signature also may be provided.

The invention does not limit the multiplicity of signatures of the computer file.

In particular, the signature is based on a Gap Diffie-Hellman (GDH) scheme. In particular, the signature implements a bilinear application defined, for example, with values in a group formed by points of an elliptical curve or of a hyper-elliptical curve.

In particular, it can be provided that the said bilinear application implements a Weil pairing or a Tate pairing.

On the basis of the properties of the GDH scheme, it is provided that the method additionally comprises a step of authentication of the computer file at least doubly signed by a public key linked to the combination of the identities of the said at least first and second entities. Verification of the authenticity of the file therefore can be achieved by means of a single public key composed from the identities of the two entities, for example by concatenation of these identities.

Increased protection of downloadable files is achieved by aggregating the signatures, since even if one of the two private keys is compromised, the other co-signatory can furnish (according to the desired degree of security) the validation required to guarantee authenticity of the downloaded file.

In addition, the guarantee furnished by the other co-signatory obviates the need to re-sign all of the files already signed by the compromised and revoked key.

In one embodiment, there is provided a preliminary step of generation of a private key (composite key) composed of at least two partial keys, each generated according to a scheme based on the identity of the entity corresponding to the private key, and each generated by a different server. In particular, two half-keys generated by two servers are selected.

According to this embodiment, it is guaranteed that only the signatory user holds its private key in its entirety. Each of the two or more servers knows only the partial private key that it has generated. This scheme satisfies the principle of non-repudiation, according to which the signatory of the file is unable to deny having signed the computer file, since it is the sole holder of the private key.

In order to guarantee effective operation of the solution according to the invention, it is provided that the generation of a private key of an entity comprises bringing the identity of the entity into conformity with a convention. The convention must be understood as formatting of identity information items, for example in a "last-name_first-name" format. The convention is known to all and makes it possible for anyone to recover the public key without external intervention in order to validate the authentication of a signed file.

In the case that the private key of an individual is compromised, it is advisable to regenerate a new private key, again on the basis of the identity (unchanged) of the individual. In this design, it is provided that the said convention comprises the addition, to the said identity, of an information item decorrelated from the said identity. In particular, the information item is variable, for example by increment or according to the date of the day or to the time.

In order to adapt the invention as well as possible to the useful life of the aircraft (approximately forty years), it is provided that the generation of private keys according to a scheme based on identity comprises the use of elliptical curves, especially hyper-elliptical curves. The mathematical properties of elliptical curves effectively make it possible to furnish safer cryptographic means than those implemented today by the prior art PKI infrastructures.

The invention also relates to a system for processing an operating computer file of an equipment item installed on board an aircraft, especially for ensuring the security thereof, the system comprising means for digital signature of the said digital file by means of at least one first private key, the said first private key being generated according to a scheme based on the identity of a first entity.

In one embodiment, there are provided means for generating a private key based on the identity of an entity and composed of at least two partial keys, the said generating means comprising at least two servers capable of generating partial keys according to a scheme based on the identity of the entity corresponding to the private key.

Optionally, the system may comprise means relating to the processing method characteristics presented hereinabove.

The invention also relates to a method for authentication of an operating computer file of an equipment item on board an aircraft, the said computer file being signed (digitally) by a first entity, the method comprising a step of verification of the signature of the said file signed from a first public key determined according to a scheme based on the identity of the said first identity.

In one embodiment, the method comprises a preliminary step of loading of the said signed computer file on board the said aircraft.

In one embodiment, there is also provided a preliminary step of determination of the first public key, the determination step being effected on board the said aircraft.

In one embodiment, the said computer file is signed by means of a plurality of private keys generated according to a scheme based on the identity of a plurality of entities, and the said public key, referred to as the global public key, is formed from public keys determined according to a scheme based on the identity of the plurality of entities. In particular, the global public key is formed by concatenation of the said public keys.

Optionally, the method may comprise steps and implement means relating to the method and system characteristics presented hereinabove.

The invention is also aimed at a system for authenticating an operating computer file of an equipment item installed on board an aircraft, the said computer file being signed by a first entity, the system comprising means for verifying the signature of the said file signed from a first public key determined according to a scheme based on the identity of the said first identity.

Optionally, the system may comprise means relating to the authentication method characteristics presented hereinabove.

The invention is also aimed at an aircraft comprising such an authentication system.

By using keys based on the identity of entities, there are also avoided the difficulties related to the management of certificates in "open" solutions relying on confidence agreements of the crossed-certification type between certification authorities and/or with delegated certification authorities.

The characteristics and advantages of the present invention will become more clearly apparent upon reading about a preferred embodiment, illustrated by the attached drawings, wherein.

The invention starts from the premise that the limits of PKI infrastructures known for their integration into the aeronautical world are directly linked to the need for certificates and therefore to the need to guarantee the link between a key to be used and an individual.

Hereinafter we will use participants of the aeronautical world, although the invention is applicable to any type of signatory entity.

Figure 1:
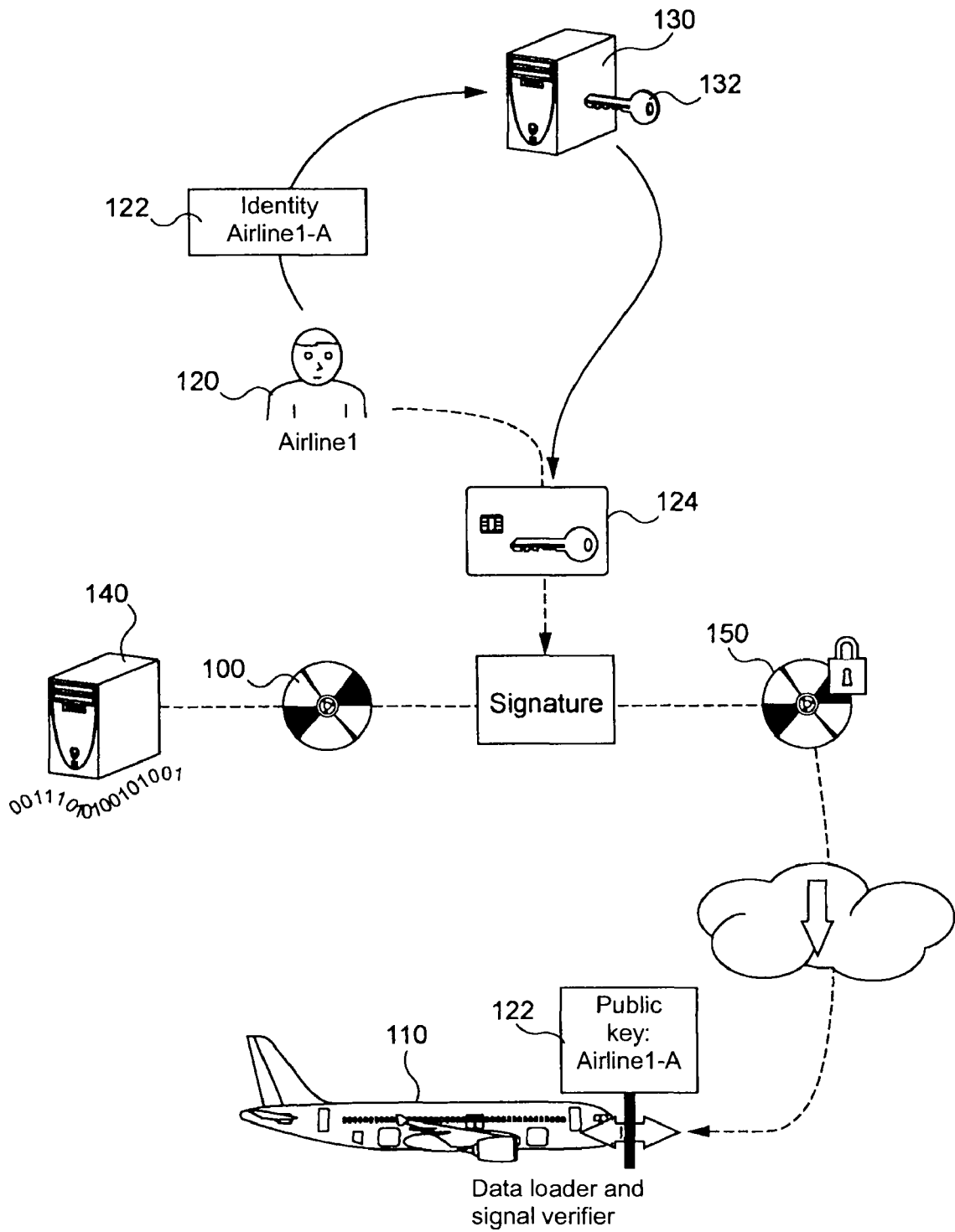
FIG. 1 illustrates the different steps of a process for signature of a computer file used in an example of the invention.

FIG. 1 illustrates the different steps implemented in the sequence of signature of a file, in this case user data 100, to be downloaded to an airplane 110.

User 120 possesses a public identity known to all, in this case "Airline 1". In the encryption scheme based on identity, a convention of naming the identities is known, in order to facilitate management and determination of user public keys. In this scheme, the public key of the user is composed in particular of the identity of the individual according to the convention.

Hereinafter "identity" and "public key" will be used as synonyms for the information item about the identity of the entity, in this case user 120, regardless of whether or not it has been formatted according to the provided convention. It is actually easy to switch from the "raw" identity to the "formatted" identity/public key. In particular, this identity is in the form of a string of alphanumeric characters.

In the example of FIG. 1, encryption public key 122 of the user "Airline 1" is easily determined as being "Airline1-A"; in this case the naming convention comprises simple concatenation of the identity data with a letter "A".

As will be seen hereinafter, the addition of a supplementary datum, in this case "A", decorrelated from the user and also variable, makes it possible to generate a "new" identity, which will be able to be used whenever it is necessary to generate a new private key for the user.

Upon initialization of the system, user 120 emits a request for generation of a private key 124 on the basis of its identity "Airline1-A", to a key generating center 130.

Center 130 secretly stores a "root" key 132, from which it calculates private keys 124 of the users. Private keys 124, for example, are established on 2048 bits. Center 130 then returns private key 124 of the user.

An example of private key generation is described in the document "*Identity-based encryption from the Weil pairing*" of Boneh et al. (SIAM J. of Computing, Vol. 32, No. 3, pp. 586-615, 2003).

During the use of the system, data 100 are generated from a generating unit 140, in this case a computer server, for example following calculations for improvement or parameterization of aeronautical equipment items.

These data are signed by user 120 by means of its private key 124, thus yielding a signed file 150.

Data 150 signed by the user are then transmitted over a communication network to airplane 110.

A file loading unit, also known as Data Loader according to English terminology, downloads signed file 150 to one or more equipment items installed in aircraft 110. An example of loading module infrastructure and associated bridge is provided in the patent document EP 1349078.

Before data are distributed to and/or installed in these equipment items, a signature verification is performed.

Public key 122 of user 120 is known within airplane 110, in this case because it is the user "Airline 1" that is the data generator.

From public key 122, in this case "Airline1-A", the downloaded data can be authenticated and, in the case of positive authentication, installed on the equipment item in question.

In particular, there is used a signature scheme based on the identity from elliptical curves. Such a scheme is explained, for example, in the publication "*ID-based signatures from pairings on elliptic curves*" of the International Association for Cryptologic Research (Paterson, http://eprint.iacr.org/2002/004.ps) or the publication "*Short signatures from the Weil Pairing*" (D. Boneh, H. Shacham and B. Lynn, *Advances in Cryptology—AISACRYPT* 2001, Springer-Verlag, 2001, pp. 514-532).

In practice, key generating center 130 makes public a certain number of parameters relating to the signature scheme. Simply by way of example, such parameters may be the following:

an additive group $G_1$ of order q formed by points on an elliptical curve, a bilinear application e: $G_1 \times G_1 \rightarrow G_2$, where $G_2$ is a multiplicative group also of order q. This application can be derived in particular from the Weil or Tate pairing, a generator P of the group $G_1$, chosen randomly, and a public value $P_{public} = s \cdot P$, where s is the root key of center 130, unidirectional hash functions $H_i$.

Private key 124 of the user is defined by $K_{private} = s \cdot H_1$ ("Airline1-A"), $H_1$ being applied on a binary representation of the character string and having value in the group $G_1$ formed by points of the ellipse. The aforesaid Boneh-Shacham-Lynn publication provides an illustration of a hash function in its Section 3.2.

The signature M' of binary data 100 then can be calculated by user 120 according, for example, to M'=k$^{-1}$(H$_2$(M)·P+H$_3$(R)·K$_{private}$)), where R=k·P, k is chosen randomly by the user and k$^{-1}$ is the reciprocal of k for the multiplication.

The signature transmitted to the data loader then is composed of R and M'.

Upon reception of a message M$_{received}$ and of the signature (M'$_{received}$, R$_{received}$) (signed data 150) on board the aircraft, authentication of data 100 M$_{received}$ can be achieved by the following verification:

$$e(M'_{received}, R_{received}) = e(P,P)\hat{\;}[H_2(M_{received})] \cdot e(P_{public}, H_1(\text{"Airline1-A"}))\hat{\;}H_3(R_{received})$$

The public parameters of center 130 are generated one single time during an initialization phase.

It is noted that the root key s is not used outside initialization phases. It is therefore possible to store this root key in a secure hardware device, in this case a chip card, without impairing the effectiveness of the system. An alternative to chip cards can be introduced by the use of slugs ("token" according to English terminology) qualified at high security level according to the FIPS 140-1 standard (Federal Information Processing Standard), such as level 3. The invention therefore presents an advantage compared with the prior art solutions based on PKI infrastructures, since there is no ongoing need for an infrastructure for management of the master key and of the associated certificates.

Figure 2:
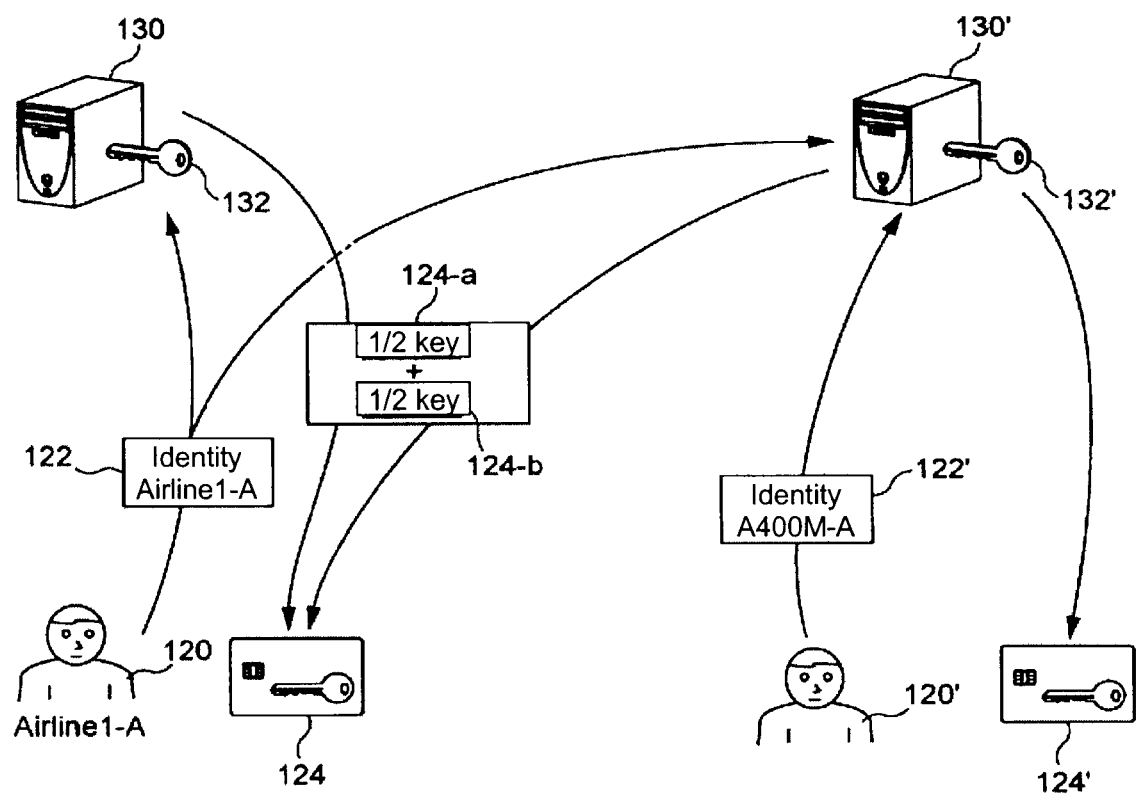
FIG. 2 represents an example of generation of a user private key alternative to that of FIG. 1.

Referring to FIG. 2, there is represented a scheme for generating a user private key 124 according to another embodiment.

The system for generating user private keys comprises a plurality of key generating centers; in this case, two servers 130, 130' are used.

During the initialization phase, user 120 "Airline 1" emits a request for generation of a private key to the attention of the two servers. The request comprises formatted identity 122 "Airline1-A".

Each center 130, 130' generates its own private key 124-a, 124-b on the basis of identity 122. Generation mechanisms similar to those described in connection with FIG. 1 may be employed.

The user receives each of the private keys generated by the centers, referred to hereinafter as partial keys, in this case half-keys.

User 120 then forms its private key 124 from the received partial keys, in this case by simple concatenation of the two half-keys 124-a and 124-b.

In the sequence of signature of computer files, user 120 signs the files with the aid of private key 124, for example in a manner similar to that described in connection with FIG. 1, and not with only one of the partial keys.

The system for signature of computer files that implements this partial key mechanism guarantees non-repudiation of signature by the user, since from then on only that user possesses private key 124 in its entirety. In fact, centers 130 and 130' each know only one partial key.

Figure 3:
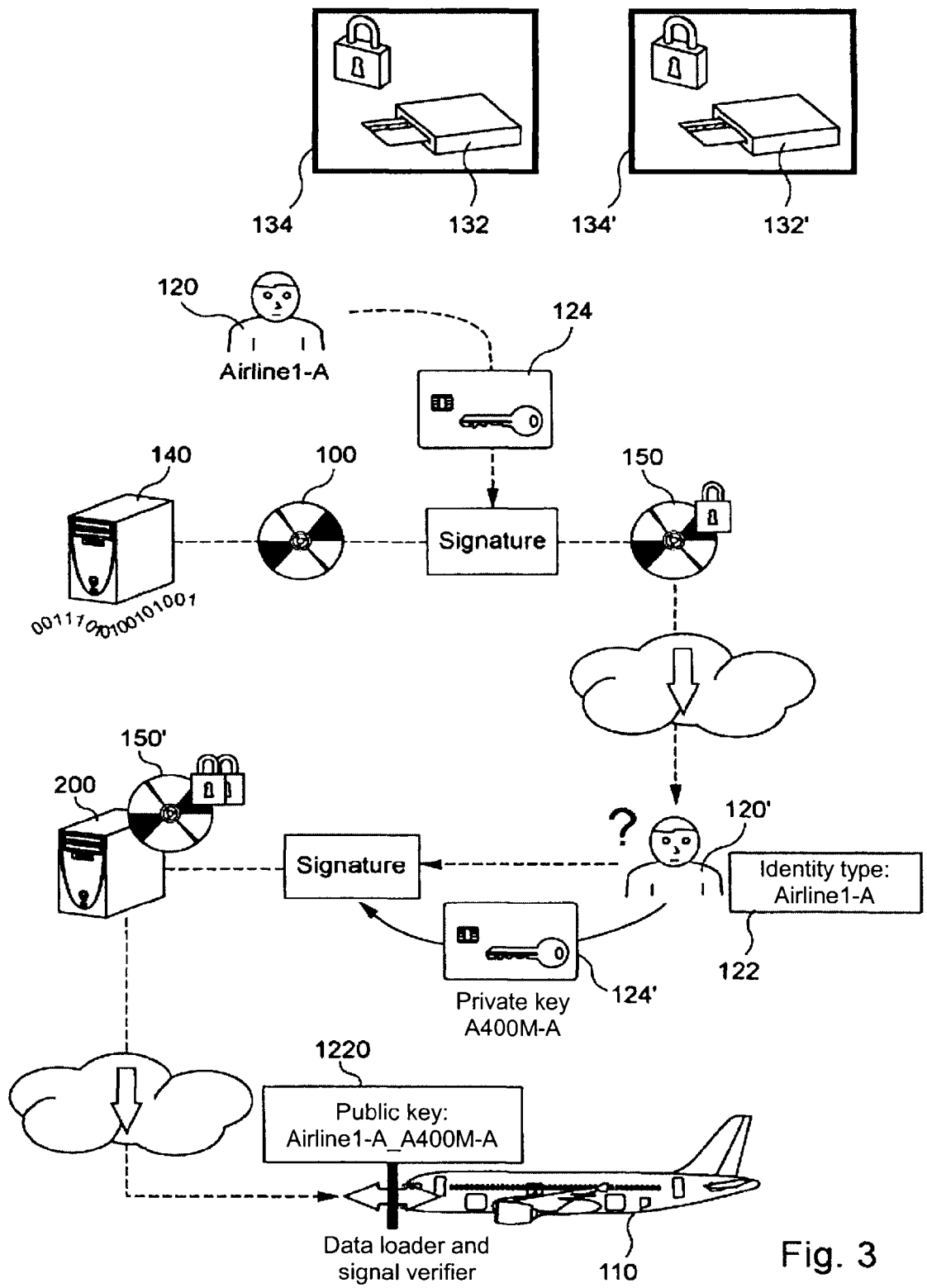
FIG. 3 illustrates the different steps of a process for multiple signature of a computer file used according to an example of the invention.

Referring now to FIG. 3, there is provided a multiple signature of the message, in this particular case a double signature, on the one hand by user 120 as the generator of data 100 and on the other hand by another entity, such as the airplane manufacturer, identified in this case by "A400M-A" according to the applicable formatting convention.

This multiple signature makes it possible to implement different successive levels of validation of the data before loading into airplane 110.

In more detail, data 100 are signed, for example, on the basis of the publication of Lin et al. "*A Structured Multisignature Scheme from the Gap Diffie-Hellman Group*" of Chih-Yin Lin, Tzong-Chen Wu and Fangguo Zhan:

a multiplicative cyclic GDH group G$_1$ of first order q is formed from points on an elliptical curve, a bilinear application e: G$_1$×G$_1$->G$_2$ is established, where G$_2$ is a multiplicative group also of order q. This application can be derived in particular from the Weil or Tate pairing. It is also possible to use a modified bilinear application ê, for example such as defined in the aforesaid Boneh-Shacham-Lynn publication, a generator P of the group G$_1$ is chosen randomly, two unidirectional hash functions H$_1$ and H$_2$: $\{0, 1\}^*$-> G$_1$\\$\{1\}$ are defined. H$_1$ is, for example, similar to the hash function of the same name described in connection with FIG. 1.

The public parameters of the system, or in other words e, P, q, G$_i$ and H$_i$, are obtained, for example, from a cryptographic library implementing the GDH signature scheme.

Private key 124 of user 120 is generated in a manner similar to FIG. 1, using the hash function H$_1$ and the root key s of center 130: K$_{private}$=s·H$_1$("Airline1-A").

Data 100 are first signed by user 120, for example in simplified manner: M'=[H$_2$(M)]$\hat{\;}$K$_{private}$.

At this stage, the authenticity of signed data 150 is verified by second participant 120' "A400M-A", with the aid public key 122 of user 120. It is possible, for example, to use the same verification mechanism as that described in connection with FIG. 1 for an appropriate signature. In connection with the properties of the GDH scheme, it is verified that the quadruplet (P, H$_1$("Airline1-A"), H$_2$(M), M') is a valid Diffie-Hellmann tuplet. This verification may implement the bilinear application e or ê to verify the equality: e(P,M')=e(H$_1$("Airline1-A"), H$_2$(M)).

In the case of positive authentication/verification, second participant 120' resigns data 100 and 150 with the aid of its private key K'$_{private}$ 124' and produces a new signature M".

This new signature can be seen as a guarantee that the data signed by user 120 are good and sufficiently authenticated, even if the keys of user 120 are subsequently compromised. In the case of loss of a private key of one or the other of the co-signatories, therefore, it is not necessarily required that all of the already co-signed files be re-signed.

Private key 124' may be generated in a manner similar to private key 124 of user 120. In particular, FIG. 2 represents generation of private key 124' by a single center 130'. This configuration may be adopted if no need for non-repudiation is required with respect to second participant 120', for example when the responsibility of the latter is continually engaged.

It also is understood that a plurality of partial keys may be generated to form private key 124', and that, in particular, this number of partial keys may be different from the number of partial keys for forming private key 124.

The scheme for the second signature M" can be defined as follows:

$$M''=[H_2(M),M']\hat{\;}K'_{private}$$

Doubly signed data 150' are deposited on a storage server 200, from which they (150') can be loaded into airplane 110. Verification of the authenticity of data 100 with the aid of the signatures furnished in data 150' and of public key 1220 is then effected before transmission and installation in the equipment items in question on board the airplane. In particular, it is verified that (P, H$_1$(public key 1220), H$_2$(M), M") is a valid Diffie-Hellman tuplet (or else that e(P, M")=e(H$_1$(public key 1220), H$_2$(M))). Public key 1220 is issued, for example, by concatenation of the two public keys 122 and 122'.

The service provided by the key generating center is necessary only during the phase of creation of private keys; no activity of a third party is necessary outside the key creation phase, or in other words during the operating phase proper (signature and verification of authenticity). This concept is illustrated by the padlocks of blocks 134 and 134'. Root keys 132 and 132' of key generating centers 130 and 130' are stored in a highly secure hardware medium, in this case a chip card, and are not accessed during the process of signature and use of signed files. The keys are said to be "sanctuarized".

To obtain a double signature that can be effectively verified by the known identities of the signatories, there is used the bilinearity of the application e. A precise demonstration is furnished by the document "*Aggregate and verifiably encrypted signatures from bilinear maps*" (Boneh et al., §3.1).

In particular, the two signatures of data 100 by the two private keys 124 and 124' are aggregated by means of a structured scheme of multisignatures. Beyond verification of the authenticity and integrity of the signature, the order of creation of the different signatures is also verified.

An example of a structured scheme of multisignatures is presented in Section 3 of the publication of Lin et al. It is noted in particular that the multisignatures can be achieved in series, in parallel or in mixed fashion. The signature scheme best adapted for the present invention is the series-type structure.

On board the airplane, verification of the multisignatures can be achieved in a manner similar to the verification of FIG. 1, for the set of the two signatures (or more in the case of multisignatures) when the signature functions being used correspond.

In particular, it is provided that public identity 1220 used to verify the multisignatures of data 100 is composed from particular identities of each of the signatories.

In FIG. 3, it is provided in particular that the public key being used is formed by concatenation of the first signatory "Airline1-A" and of the second signatory "A400M-A" according to an algorithm for verification of multisignatures, such as that of Section 3 of the publication of Lin et al.

In particular, it is possible to use any type of (public) function to generate global public key 1220 according to the public identities of the diverse entities that have signed the file. The function being used may also take into account the structured multisignature scheme being used. As an example, the example of Section 3 of the publication of Lin et al. takes the multisignature scheme into account. It is noted that, in contrast to this example, the present invention relies on a public key/private key pair based on identity (IBE), or in other words without a certificate. Nevertheless, this adaptation in no way modifies the signature principle such as explained in that publication.

In general, it has been observed that the "Gap Diffie-Hellman" signature (Boneh-Shacham-Lynn publication) exhibits mathematical properties adapted to the multisignature scheme, among which it will be noted that:

1/ the aggregate of signatures made by the co-signatories is verifiable by a function of "multisignatures" type;
2/ the size of the multisignatures is the same as that of a single signature;
3/ the size of the multisignatures is independent of the number of co-signatories;
4/ any part of the multisignatures can be publicly verified;
5/ the same algorithm is used for verification of the multisignatures, or of part of the multisignatures or of a single signature.

The double signature makes it possible in particular to preserve the already signed files, even if one of the signatory private keys has been revoked in the interim. In particular, to guarantee the authenticity of the signed file, it is sufficient that only one of the signatory private keys not be compromised.

Nevertheless, depending on the level of security required, it is possible to restrict validation of the authenticity of a file exclusively to files in which none or a predetermined fraction of the signatory private keys has been compromised.

Figure 4:
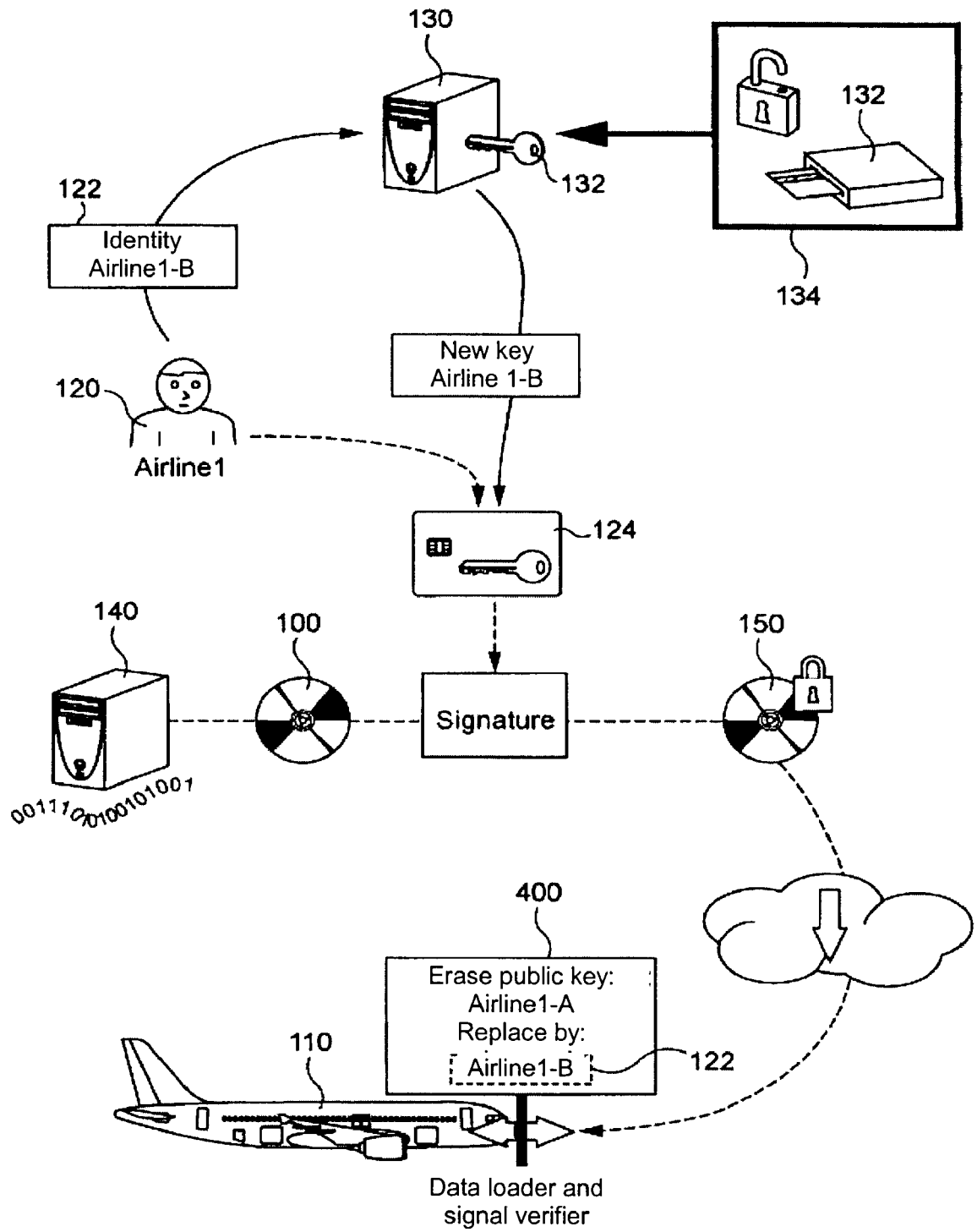
FIG. 4 illustrates a first example of a process of renewal of user private keys according to the invention.

Referring to FIG. 4, there now will be described the process of renewal of user private keys when a private key is compromised and therefore revoked by the system.

In this example, private key 124 "Airline1-A" has been compromised and a single key generating center 130 is being used. The Airline 1 use is then responsible for alerting all parties concerned about the revocation of its private key "Airline1-A". In fact, the crypto system of IBE type does not make it possible to escape from problems related to the loss of a private key and from the necessity for revocation of that key. Thus, to ensure that a third party with malicious intentions does not find and use the lost key for malicious purposes, provisions exist to alert the community that the key no longer will be used by its legitimate owner and that the public key thereof is consequently being modified.

This realization will be easily extended to the presence of a plurality of key generating centers as well as to the case of multiple signatures for which the generation of private keys is effected independently from one key to another.

For the operation of regeneration of a private key, root key 132 is "desanctuarized", or in other words returned to service, as illustrated by the opening of the padlock of block 134. From then on, key generating center 130 has access to the value s of root key 132.

A new identity 122 is first generated for user 120. Since the raw identity "Airline 1" cannot be modified, the additional character "A" is replaced by a "B". In this way there is obtained a new identity "Airline1-B". The identities thus are incremented successively, in this case from A to Z, whenever an identity is lost.

In general, the formatting convention adds, to the raw identity, a datum that is decorrelated therefrom and that is modified, for example by increment during generation of a new private key. In particular, there is envisioned the use of one or more alphanumeric characters, or the use of a date, for example in the format YYYYMMDD.

A public table keeping the current value of this supplementary datum up to date may be available in key management center 130. This table may be signed by one or more members of the community to guarantee the authenticity thereof. A copy of all or part of the table may also be stored on board airplane 110.

Starting from a request of user 120 containing the new identity "Airline1-B", center 130 generates, with the aid of desanctuarized root key 132, a new private key 124 for the user.

After use, root key 132 is re-sanctuarized in the chip card provided for this purpose.

Since the old compromised public key 124 "Airline1-A" is no longer permitted to be used on board the airplane to verify the authenticity of files, a request 400 to update the table of public keys is effected, especially the table on board airplane 110.

This request comprises erasure of the old key with the command "Erase Public Key Airline1-A" according to English terminology and replacement thereof by the new private key with the command "Replace by Airline1-B" according to English terminology.

As illustrated by FIGS. 1 and 3, the processes of signature of files and verification of the authenticity of these signed files from then on may continue to be applied on the basis of the identity "Airline1-B" and if necessary "A400M-A".

The files in service already emitted and signed by use 120 Airline 1 and stored in storage server 200 may:

either be re-signed with new private key 124 associated with the identity Airline1-B then revalidated, in the case of FIG. 3, with the private key associated with A400M-A;

or be retained in their current status since, even in the case of fraudulent use of the key Airline1-A, no new file signed with this key will be validated by A400M-A. Only the files signed when the private key associated with Airline1-A was not revoked and validated by A400M-A from then on will be accepted for downloading to airplane 110.

Figure 5:
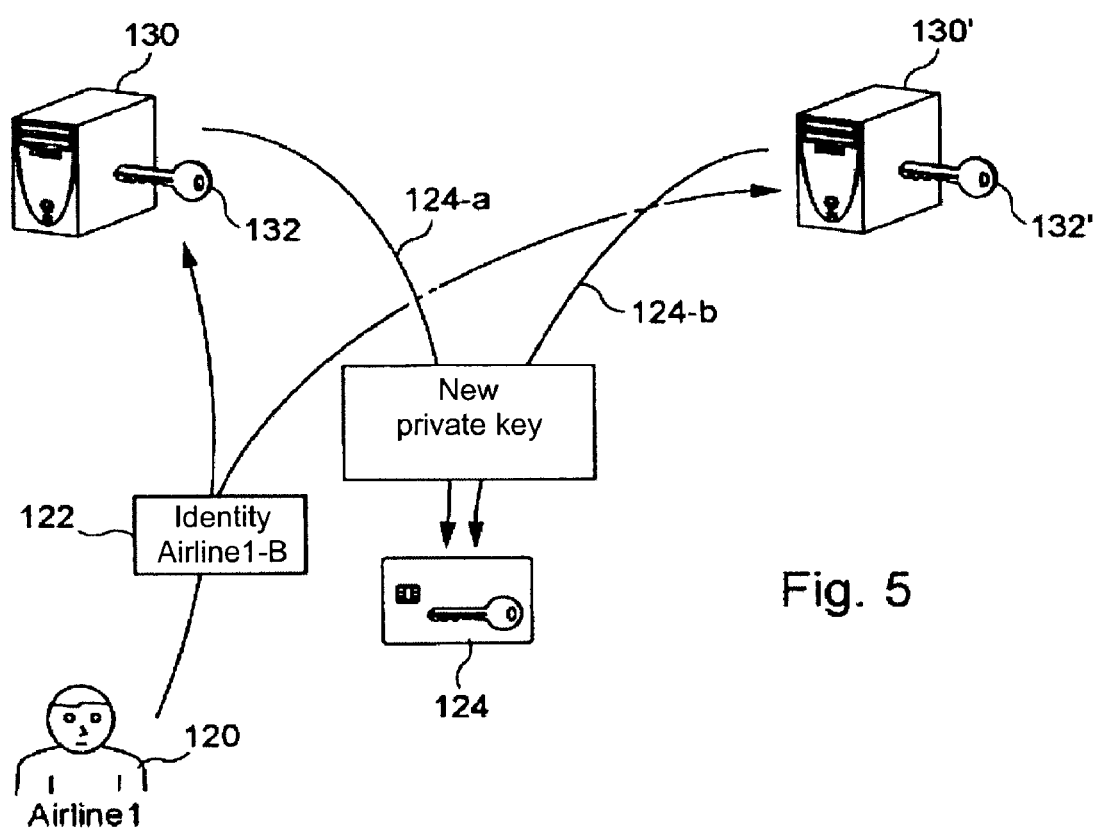
FIG. 5 illustrates a second example of private key renewal in the presence in particular of two key generation centers.

FIG. 5 illustrates this renewal of private key 124 in the presence of two key generating centers 130 and 130'.

At the same time, the new identity "Airline1-B" 122 formed as indicated with reference to FIG. 4 is transmitted in the form of a request for a new private key to the two centers 130 and 130'.

Root keys 132 and 132' thereof have been returned to service. The two centers then generate the two private half-keys 124-a and 124-b respectively.

A new user private key 124 is then formed at the level of user 120 on the basis of these two half-keys, in this case, for example, by simple concatenation.

A request 400 for updating of airplanes with the new available public key 122 is effected on the same bases as the request described in connection with FIG. 4.

Figure 6:
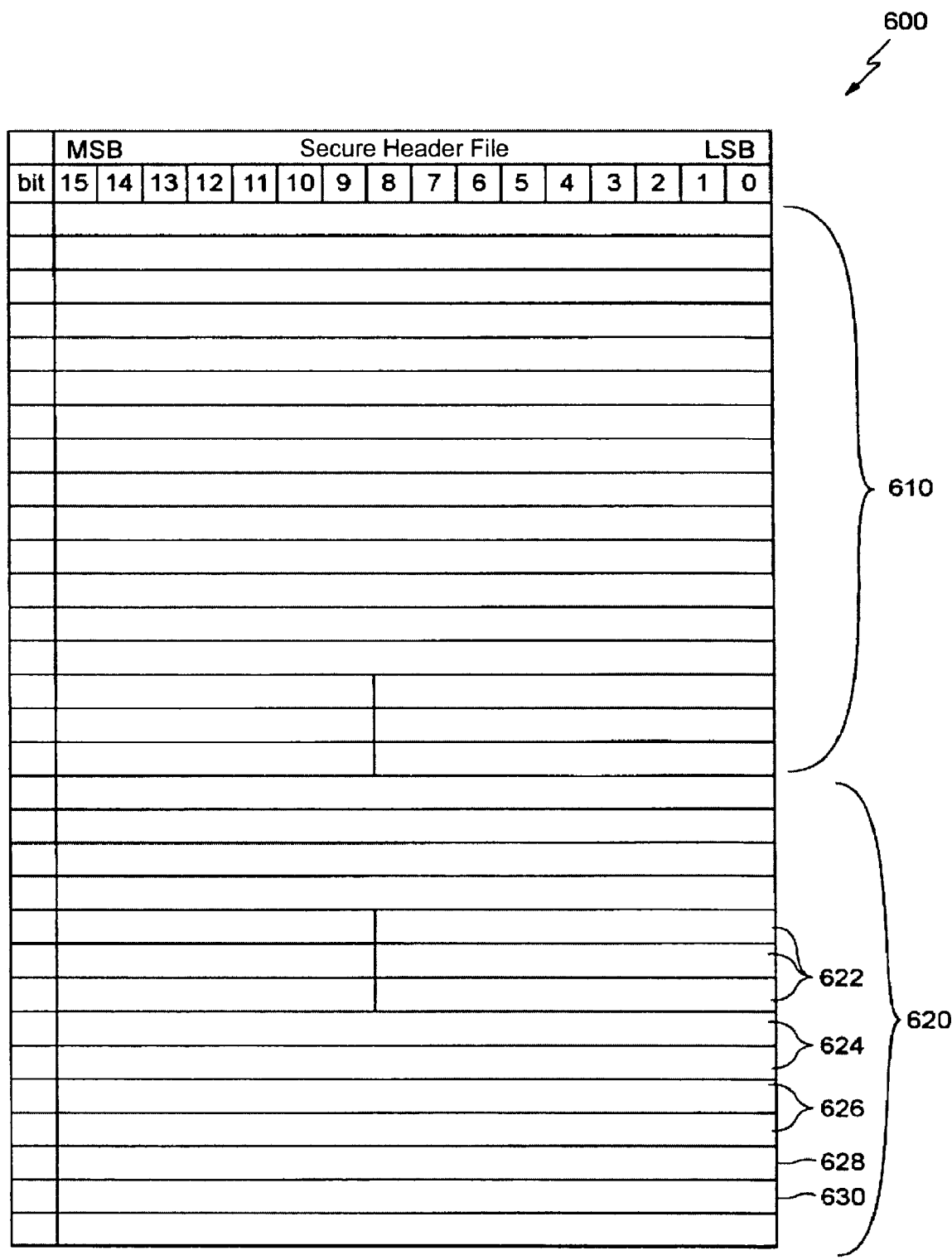
FIG. 6 represents a downloadable file header for implementation of the invention.

Referring to FIG. 6, there is represented a header 600 SHF ("Secure Header File" according to English terminology), which permits the support for signatures for files that can be downloaded to an airplane.

This header indicates a list of computer files, respectively comprising loading header 610 according to the aforesaid ARINC 665 standard, the set 620 of data and support files of which they are composed, and the name 622, the size 624, the number 626 of data blocks, the respective size 628 of these blocks and the integrity elements 630 of these blocks.

By virtue of the signature of data according to the invention, there is no need for header SHF 600 to comprise a field dedicated to a certificate. Such fields have therefore been eliminated compared with conventional headers.

Thus access to a sensitive datum is no longer necessary on board the airplane during the main processes of signature of computer files and verification of the authenticity of the files. In this way sensitive data, such as a generating root key, are protected more effectively.

In particular, if no private key is revoked, no access to secret root key 132 will take place throughout the useful life of the airplane.

The present invention can be implemented in the form of computer program(s) executed on one or more reprogrammable calculating machines, such as a personal computer PC, a digital signal processor DSP ("Digital Signal Processor" according to English terminology) or a microcontroller.

The foregoing examples are merely some embodiments of the invention, which is not limited thereto.

The invention claimed is:

1. A method for processing an operating computer file of an equipment item installed on board an aircraft, the method comprising:

generating, by at least one processor, at least one first private key according to a scheme based on an identity of a first entity, the at least one first private key being unique to the first entity;

digitally signing the computer file using the at least one first private key; and transmitting the digitally signed computer file to the aircraft through a network without a digital certificate that certifies the identity of the first entity.

2. The processing method according to claim 1, further comprising:

digitally signing the computer file by at least one second private key, the at least one second private key being generated according to a scheme based on a second identity of a second entity.

3. The processing method according to claim 1, wherein the at least one processor includes a first processor and a second processor, the processing method further comprising:

generating, by the first processor, a first partial key according to a scheme based on the identity of the first entity;

generating, by the second processor, a second partial key according to a scheme based on the identity of the first entity, wherein the generating of the at least one first private key of the first entity includes combining the first partial key and the second partial key.

4. The processing method according to claim 1, wherein the generating of the at least one first private key of the first entity includes bringing the identity of the first entity into conformity with a convention.

5. The processing method according to claim 4, wherein the convention includes an addition, to the identity, of an information item decorrelated from the identity.

6. The processing method according to claim 1, further comprising:

storing the digitally signed computer file in a data loader on board the aircraft; and sending the digitally signed computer file to the equipment item.

7. A method for authenticating an operating computer file of an equipment item installed on board an aircraft, the computer file being signed by a first entity, the method comprising:

verifying, by a processor on board the aircraft, a signature of the signed computer file from a first public key determined according to a scheme based on an identity of the first entity, without using a digital certificate that certifies the identity of the first entity.

8. The authentication method according to claim 7, further comprising:

determining the first public key, effected on board the aircraft.

9. The authentication method according to claim 7, wherein the computer file is signed by a plurality of private keys generated according to a scheme based on identities of a plurality of entities, and the first public key is formed from public keys determined according to a scheme based on the identities of the plurality of entities.

10. The authentication method according to claim 7, further comprising:
receiving the signed computer file on board the aircraft through a network;
storing the signed computer file in a data loader on board the aircraft; and
sending the verified signed computer file to the equipment item.

11. A system for authenticating an operating computer file of an equipment item installed on board an aircraft, the computer file being signed by a first entity, the system comprising:
a verification unit on board the aircraft configured to verify, using a processor, a signature of the signed computer file from a first public key determined according to a scheme based on the identity of the first entity, without using a digital certificate that certifies the identity of the first entity.

12. The system according to claim 11, further comprising:
a data loader configured to receive the signed computer file on board the aircraft through a network, configured to store the signed computer file, and configured to send the verified signed computer file to the equipment item.

13. An aircraft comprising:
an authentication system that authenticates an operating computer file of an equipment item installed on board an aircraft, the computer file being signed by a first entity, the system including
a verification unit on board the aircraft configured to verify, using a processor, a signature of the signed computer file from a first public key determined according to a scheme based on the identity of the first entity, without using a digital certificate that certifies the identity of the first entity.

14. The aircraft according to claim 13, wherein the authentication system further includes
a data loader configured to receive the signed computer file on board the aircraft through a network, configured to store the signed computer file, and configured to send the verified signed computer file to the equipment item.

\* \* \* \* \*